United States Patent
Durdag et al.

(10) Patent No.: US 6,193,774 B1
(45) Date of Patent: Feb. 27, 2001

(54) REFLOW SOLDER CONVECTION OVEN WITH A PASSIVE GAS DECONTAMINATION SUBSYSTEM

(75) Inventors: Kerem Durdag, Dover; Tom Sherwin, Newfields; Robert Silveri, Manchester, all of NH (US)

(73) Assignee: Conceptronic, Inc., Portsmouth, NH (US)

( * ) Notice: Subject to any disclaimer, the term of this patent is extended or adjusted under 35 U.S.C. 154(b) by 0 days.

(21) Appl. No.: 09/255,080

(22) Filed: Feb. 19, 1999

(51) Int. Cl.[7] .................................................. B01D 45/08

(52) U.S. Cl. ........................ 55/385.6; 55/428.1; 55/442; 34/77

(58) Field of Search .................... 55/385.1, 385.6, 55/442, 443, 444, 428.1; 34/76, 77, 79, 82, 73; 228/42

(56) References Cited

U.S. PATENT DOCUMENTS

| | | | |
|---|---|---|---|
| 3,250,263 | * | 5/1966 | Gerjets ..................................... 55/442 |
| 3,526,970 | * | 9/1970 | Harrison et al. ......................... 34/79 |
| 5,347,103 | * | 9/1994 | LeMieux ............................... 219/400 |
| 5,611,476 | * | 3/1997 | Soderlund et al. ..................... 228/42 |
| 5,993,500 | * | 11/1999 | Bailey et al. ........................ 55/385.6 |

* cited by examiner

*Primary Examiner*—David A. Simmons
*Assistant Examiner*—Robert A. Hopkins
(74) *Attorney, Agent, or Firm*—Iandioro & Teska

(57) ABSTRACT

A reflow solder convection oven with a passive gas decontamination subsystem. This subsystem includes an intake duct in fluid communication with the gas outtake of a heating zone of the oven, at least one decontamination duct connected on one end to the intake duct, the decontamination duct including a plurality of collision baffles therein for collecting contaminants from the gas in the oven, and an outtake duct connected to the decontamination duct on an end opposite the intake duct and in fluid communication on an opposite end with the gas intake of the heating zone.

5 Claims, 6 Drawing Sheets

REFLOW SOLDER CONVECTION OVEN WITH A PASSIVE GAS DECONTAMINATION SUBSYSTEM

FIELD OF THE INVENTION

This invention relates to a reflow solder convection oven with a passive gas decontamination subsystem, and a gas decontamination system useful in environments other than reflow solder convection ovens.

BACKGROUND OF THE INVENTION

Reflow solder convection ovens are used in the production of printed circuit boards employing surface mount technology. Most convection ovens include a number of heating zones spaced along a conveyer which carries the printed circuit boards through the various heating zones. Each heating zone usually includes upper and lower heating elements, and a fan or blower associated with each heater element. The fan blows air, or nitrogen, or some other gas through the heater elements and the heater elements then heat the gas before it moves over and about the printed circuit boards.

After the heated gas passes over the printed circuit boards, various contaminants, for example, alcohol, aldehydes, ketones, acids, rosins and resins are released into the oven and carried by the oven gas flow.

These contaminants often foul the internal components and surfaces of the convection oven to the point that a thick, viscous, tacky paste or fluid or residue is deposited on certain components and surfaces. In some cases, this contamination can cause failure of various oven components. The periodic maintenance required to clean the oven internals reduces productivity.

One attempt to alleviate this problem included the use of a condenser and filter assembly and a fan which urged the contaminated convection oven gas through the condenser and filter. In practice, however, the condenser and filter fouled too quickly and too often, choking off the flow of gas and adversely affecting oven performance, until cleaned.

BRIEF SUMMARY OF THE INVENTION

It is therefore an object of this invention to provide a convection oven with an oven gas decontamination subsystem which reduces fouling of the convection oven components and surfaces.

It is a further object of this invention to provide such an oven gas decontamination subsystem which is passive and requires no additional moving parts.

It is a further object of this invention to provide such an oven gas decontamination subsystem which does not require the use of condensers or filters or similar active systems.

It is a further object of this invention to provide such an oven gas decontamination subsystem which itself does not fail or become clogged.

It is a further object of this invention to provide such an oven gas decontamination subsystem which is easy to clean.

It is a further object of this invention to provide an oven gas decontamination subsystem which may be useful in environments other than solder reflow convection ovens.

This invention results from the realization that fouling of a reflow solder convection oven by contaminants present in or carried by the heating gases of the oven which condense or deposit on various components of the oven and that the clogging problem associated with prior art active decontamination systems including condensers and filters can be eliminated by a passive decontamination subsystem which is driven by the pressure and temperature differentials inherent in a convection oven and which uses a network of collision baffles to capture the contaminants instead of condensers and filters which themselves quickly become fouled and clogged This invention features a reflow solder convection oven comprising at least one heating zone with a gas intake and a gas outtake, and a passive gas decontamination subsystem including an intake duct in fluid communication with the gas outtake of the at least one heating zone, and at least one decontamination duct connected on one end to the intake duct. The decontamination duct includes a plurality of collisions baffles therein for collecting contaminants from the gas outtake of the at least one heating zone. Also included is an outtake duct connected to the decontamination duct on an end opposite the intake duct and in fluid communication on an opposite end with the gas intake of the at least one heating zone.

The intake duct is typically vertically disposed and includes a drip tray therein to capture any contaminate condensing in the intake duct. The outtake duct is also usually vertically disposed and includes a drip tray therein to capture any contaminates condensing in the outtake duct. The at least one decontamination duct, however, is preferably horizontally disposed.

The decontamination duct includes a removable wall and the collision baffles are preferably attached to the removable wall for easy cleaning thereof. The removable wall is usually the top cover of the decontamination duct.

The collision baffles are preferably disposed at an acute angle between 40°–80° with respect to the longitudinal axis of the decontamination duct. The collision baffles are preferably disposed at an angle away from the flow direction to create a turbulent flow. The baffles usually have one dimension (e.g. width) with extends across the center line of decontamination duct and another dimension (e.g. length or height) which spans approximately from one side of the decontamination duct to an opposite side of the decontamination duct.

In the preferred embodiment, the decontamination duct is square with a sloped bottom and the baffles are rectangular plates. The decontamination duct and the plates are typically made of aluminum.

The at least one zone which receives the decontaminated gas is preferably a zone other than the reflow zone such as the "pre-flow" or "soak" zone. There typically are n total zones and the intake duct is proximate the $n^{th}$ or last zone. This arrangement helps insure that the system processes all the convection oven gas in an effective manner.

In the preferred embodiment, there are two decontamination ducts, one intake duct connected to both decontamination ducts and two outtake ducts, one each connected to a decontamination duct, one each connected to a different gas outtake.

The closed, passive gas decontamination system of this invention includes an intake duct responsive to a gas flow containing contaminants within the convection oven; a decontamination duct connected on one end to the intake duct, the decontamination duct including a plurality of collision baffles therein for collecting contaminants from the gas; and an exhaust duct connected to the decontamination duct opposite the intact duct and terminating at a location within the oven remote from the intake duct.

The passive gas decontamination system of this invention, useful for convection oven and other environments, has a duct assembly including an intake region, a decontamination region, and an exhaust region, the decontamination region including a plurality of collision baffles for collecting contaminates in the gas on the surfaces thereof.

The decontamination region typically includes a duct with a removable wall and the collision baffles are attached to the removable wall for cleaning thereof. The removable wall is preferably the top cover of the decontamination duct.

The collision baffles are preferably disposed at an acute angle (e.g., 40°–80°) with respect to the longitudinal axis of the decontamination region and disposed at an angle away from the flow direction. The baffles also typically have one dimension with extends across the center of the decontamination region and another dimension which spans approximately from one side of the decontamination region to an opposite side of the decontamination region.

BRIEF DESCRIPTION OF THE DRAWINGS

Other objects, features and advantages will occur to those skilled in the art from the following description of the preferred embodiment and the accompanying drawings, in which:

Reflow solder convection oven 10, FIG. 1, of this invention includes conveyer 12 for transporting printed circuit boards passing by or through a number of heating zones within oven 10. There may, for example, be 5, 6, 8, 11, or 14 such zones. In FIG. 1, zone 20 with associated upper fan 22 is a solder "pre-flow zone" or "soak" zone and actually the third zone of five in this specific embodiment. Zone 24 or 26 associated with upper fans 28 and 30 are solder flow zones. Typically, each zone includes an upper heater element and a fan and a lower heater element and a fan. The printed circuit boards pass between the upper and lower heater elements along conveyor 12. The lower heater elements and fans of zones 22, 24, and 26 are not shown in the drawings.

Figure 1:
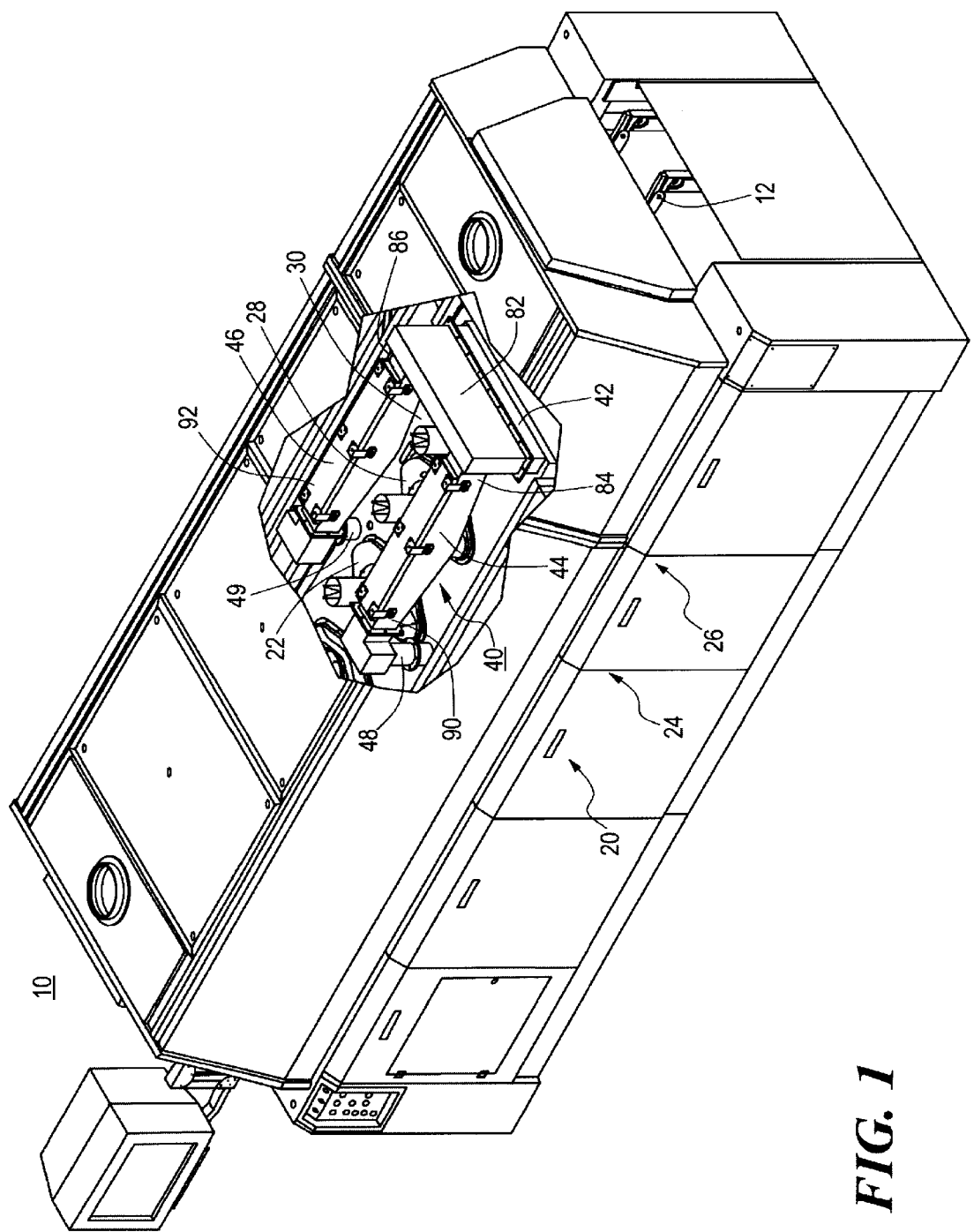
FIG. 1 is an isometric, cutaway view of the convection oven of this invention including a passive decontamination subsystem.
Figure 2:
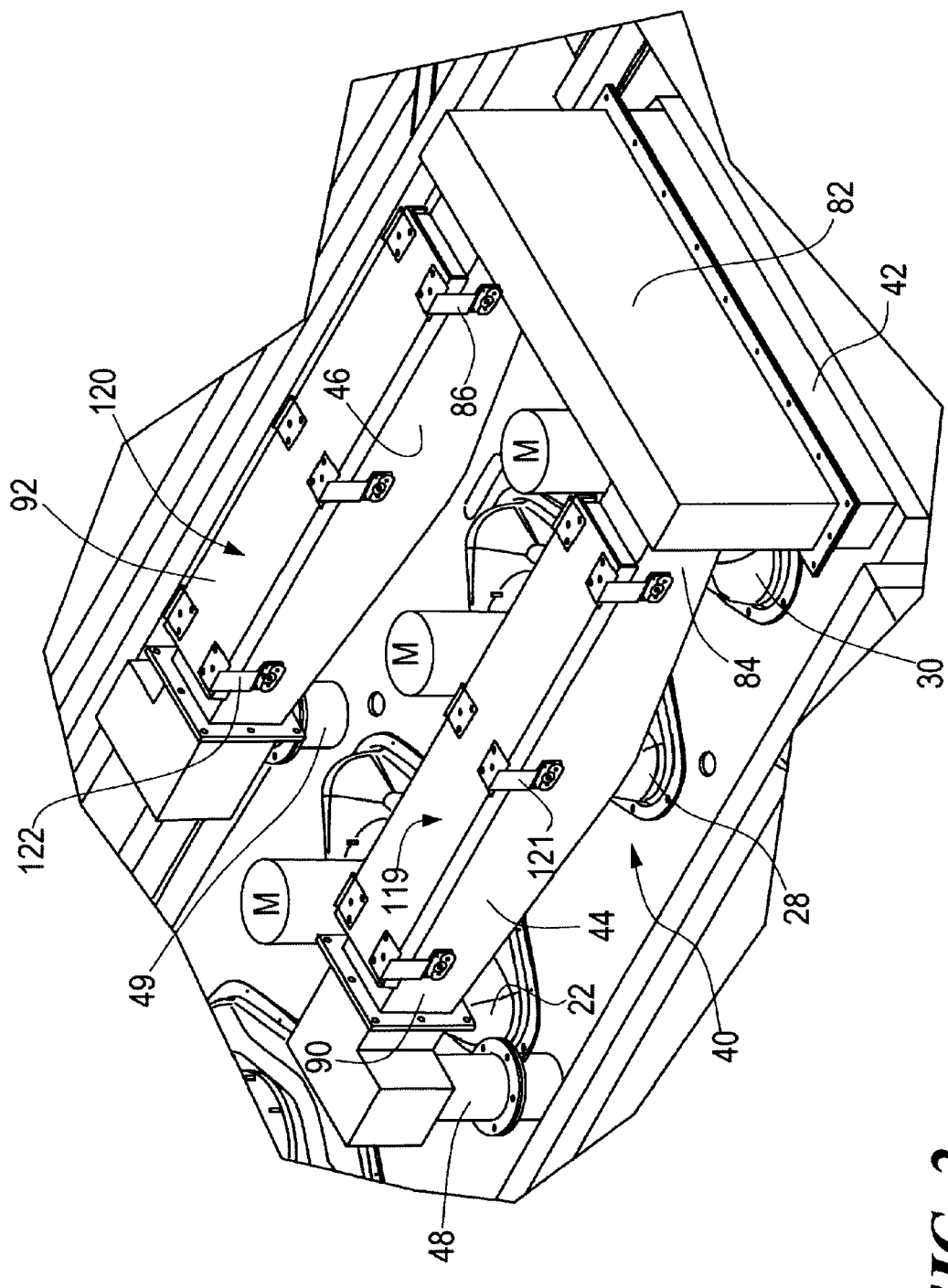
FIG. 2 is an isometric view of the passive decontamination subsystem of this invention exposed in FIG. 1.
Figure 3:
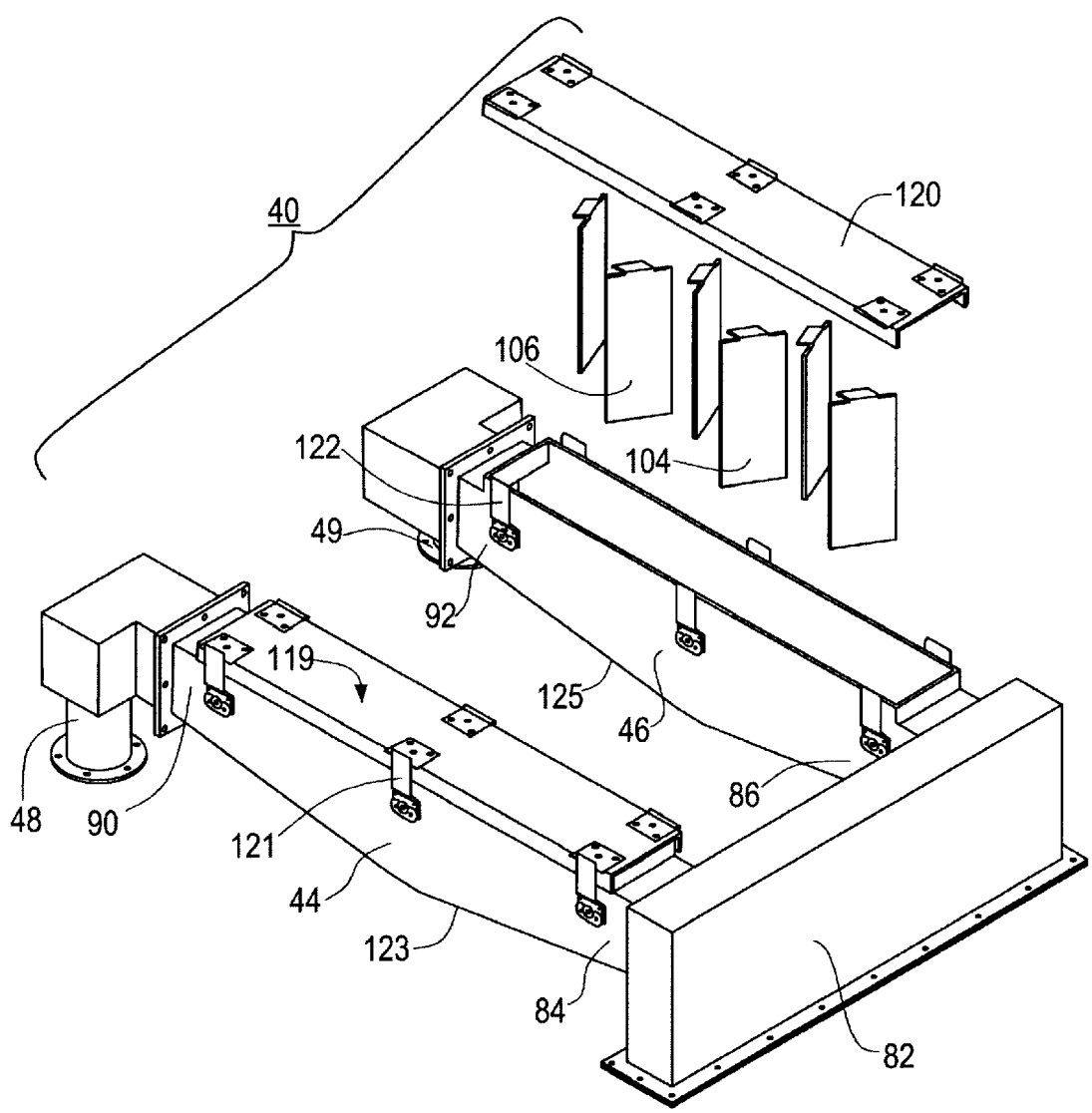
FIG. 3 is an isometric, partially exploded view of the decontamination subsystem shown in FIG. 2.

Passive decontamination subsystem 40, FIGS. 1–3, of this invention includes vertically disposed intake duct 42, horizontally disposed decontamination ducts 44 and 46, and vertically disposed outtake or exhaust ducts 48 and 49 defining intake, decontamination, and exhaust regions, respectively.

Figure 5:
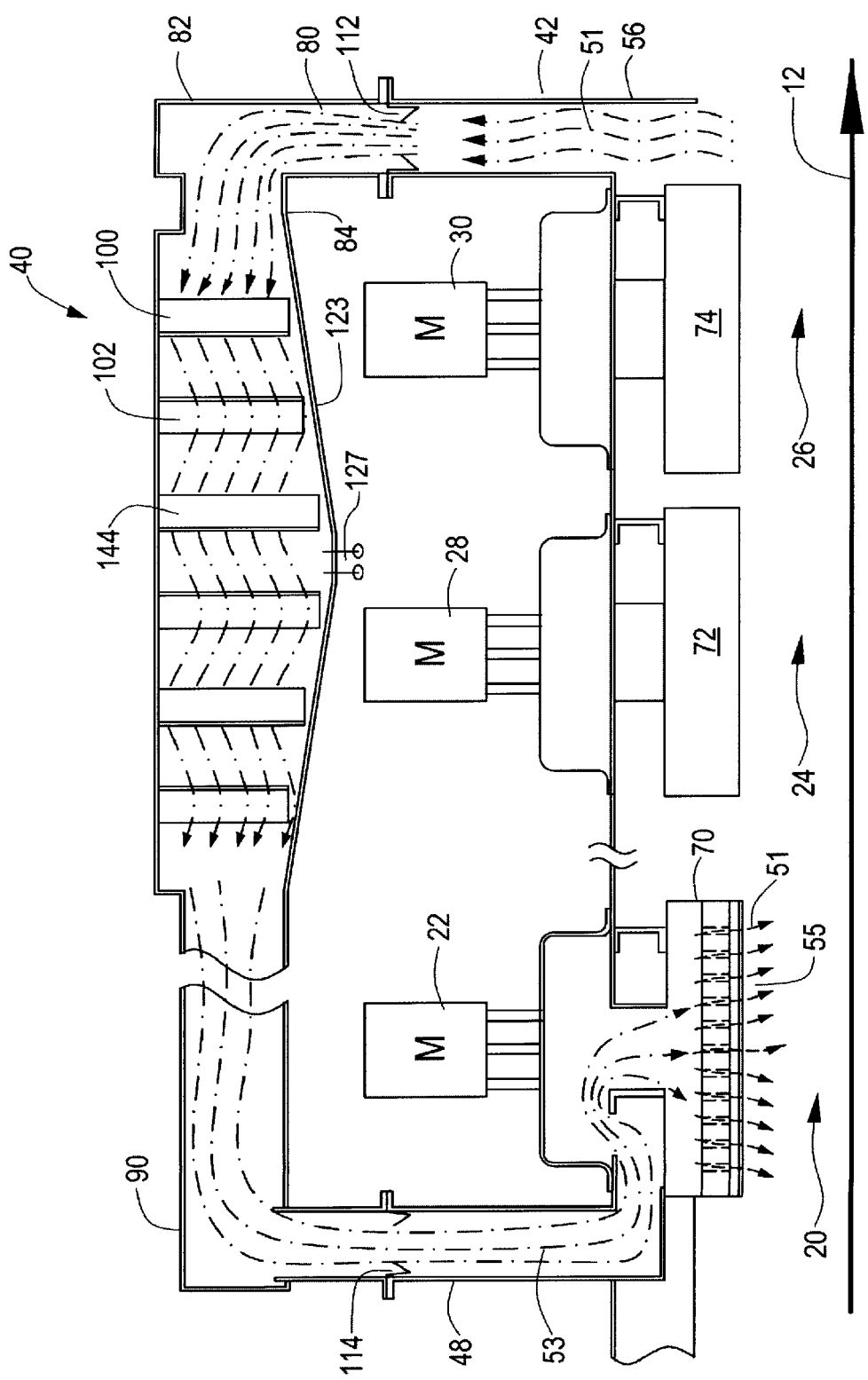
FIG. 5 is a side cross sectional view of the passive decontamination subsystem of this invention.

Intake duct 42 is in fluid communication at distal end 56, FIG. 5, with the gas outtake 55 of heating zone 20 (and the gas outtakes of heating zones 24, and 26 as well as all the other zones) via the position of duct end 50 within the interior of oven 10, FIG. 1 at the high pressure region of the oven as shown to receive contaminated convection oven gas 51. Distal end 56 is preferably located beyond (in the direction of the printed circuit board travel) the last, or $n^{th}$ heating zone of an oven having n zones, in this example, zone 26, FIGS. 1 and 5.

As shown in FIG. 5, each zone typically contains an upper fan that blows air, or nitrogen, over and through an upper heating element such as heating elements 70, 72, and 74. The printed circuit boards travel along conveyer 12, FIG. 1, under these heating elements 70, 72, and 74 and typically over a corresponding set of lower heating elements (and fans) not shown.

The proximal end 80 of intake duct 42 is in fluid communication, via supply plenum 82, with ends 84 and 86 of decontamination ducts 44 and 46, respectively, FIGS. 1–5. Opposite ends 90 and 92 of respective decontamination ducts 44 and 46 are connected to the upper end of outtake or return ducts 48 and 49. The lower ends of each outtake, or return duct, are connected to the intake of a selected blower or fan assembly as shown in FIG. 5. Preferably, the selected fan is the fan associated with a heating zone other than the reflow zone. In the preferred embodiment, the outtake duct supplies decontaminated convection gas 53 to pre-reflow or "soak" zone fan 22 at the low pressure region of the oven.

Decontamination of contaminated gas 51 occurs mainly in horizontally disposed decontamination ducts 44 and 46 due to cooling through the duct walls which can be enhanced by the use of heat sinks, and/or cooling gas, and/or by the use of the plurality of collision baffles 100, 102, 104, 106, etc., FIGS. 3, 4, 5, and 6. The collision baffles shown are discrete components but could instead be formed and integral in decontamination duct 44. Alternatively, decontamination duct 44 could be in an undulating shape. Accordingly, "collision baffles" as used herein is taken to mean any surface structure which interferes with the flow of the oven gas.

Figure 4:
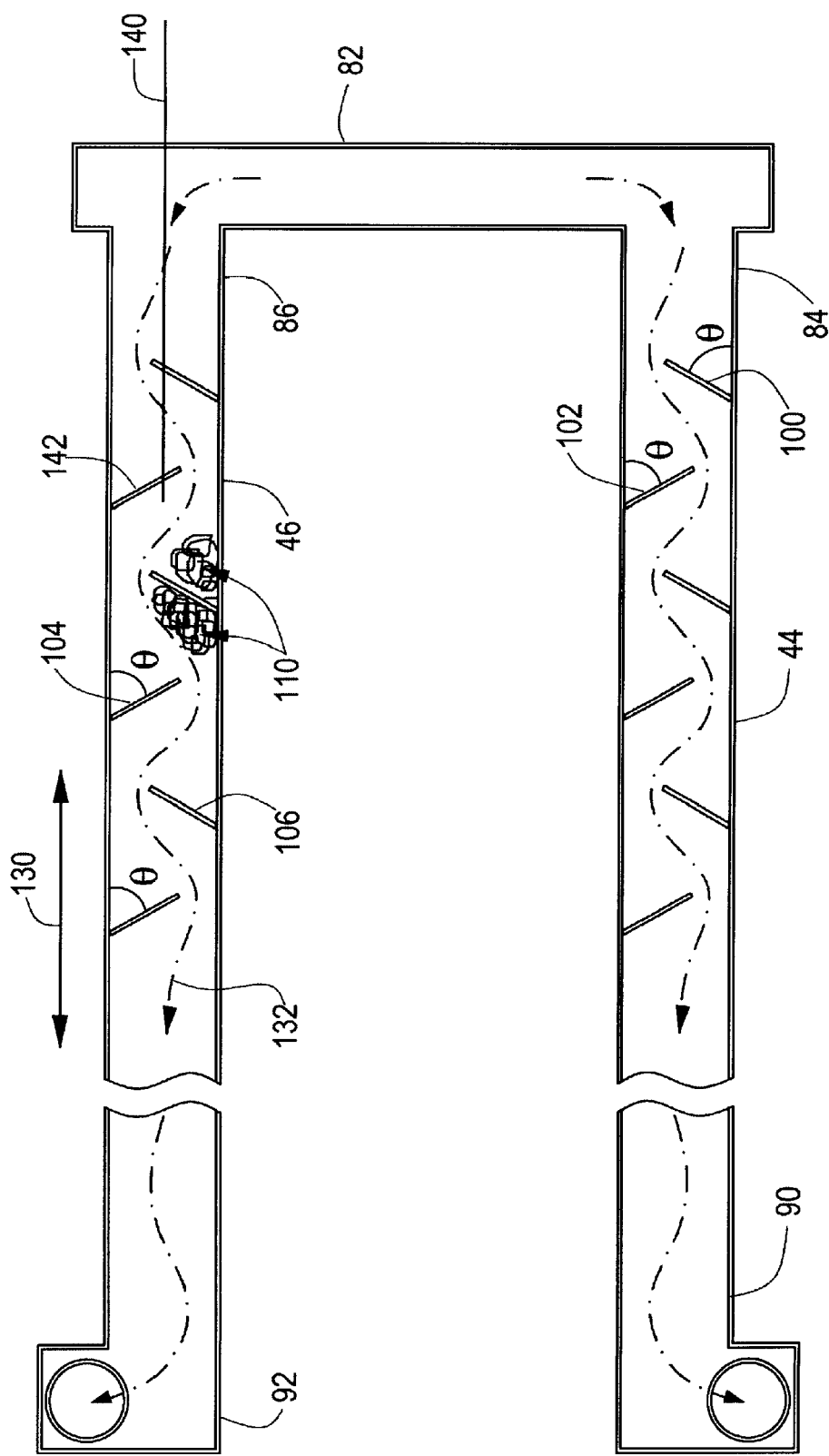
FIG. 4 is a top view of the decontamination subsystem shown in FIGS. 2 and 3.

These baffles collect contaminates carried by gas 51 by means of acceleration and de-acceleration of the contaminate molecules and hence changes in kinetic energy as the gas travels among and about the baffles as shown in FIGS. 4 and 5. The baffles are angled into the flow to generate localized vortex regions and create turbulence as shown at 110 and thus the contaminants congeal, or condense, onto the baffle surfaces. In addition, any contaminants which deposit on the interior of intake duct 42 is captured by drip tray 112 and any contaminants which deposit on the interior of outtake duct 48 are captured by drip tray 114. Cooling of the gas also reduces its kinetic energy which assists in the collection of contaminates.

In the preferred embodiment, all the baffles are physically attached at one end to removable top covers 119 and 120, FIG. 3, of decontamination ducts 44 and 46, respectively, so that they can be easily cleaned by simply removing covers 119 and 120 and subjected them to a solvent wash. Covers 119 and 120 are removable via clasps 121, 122, etc.

Figure 6:
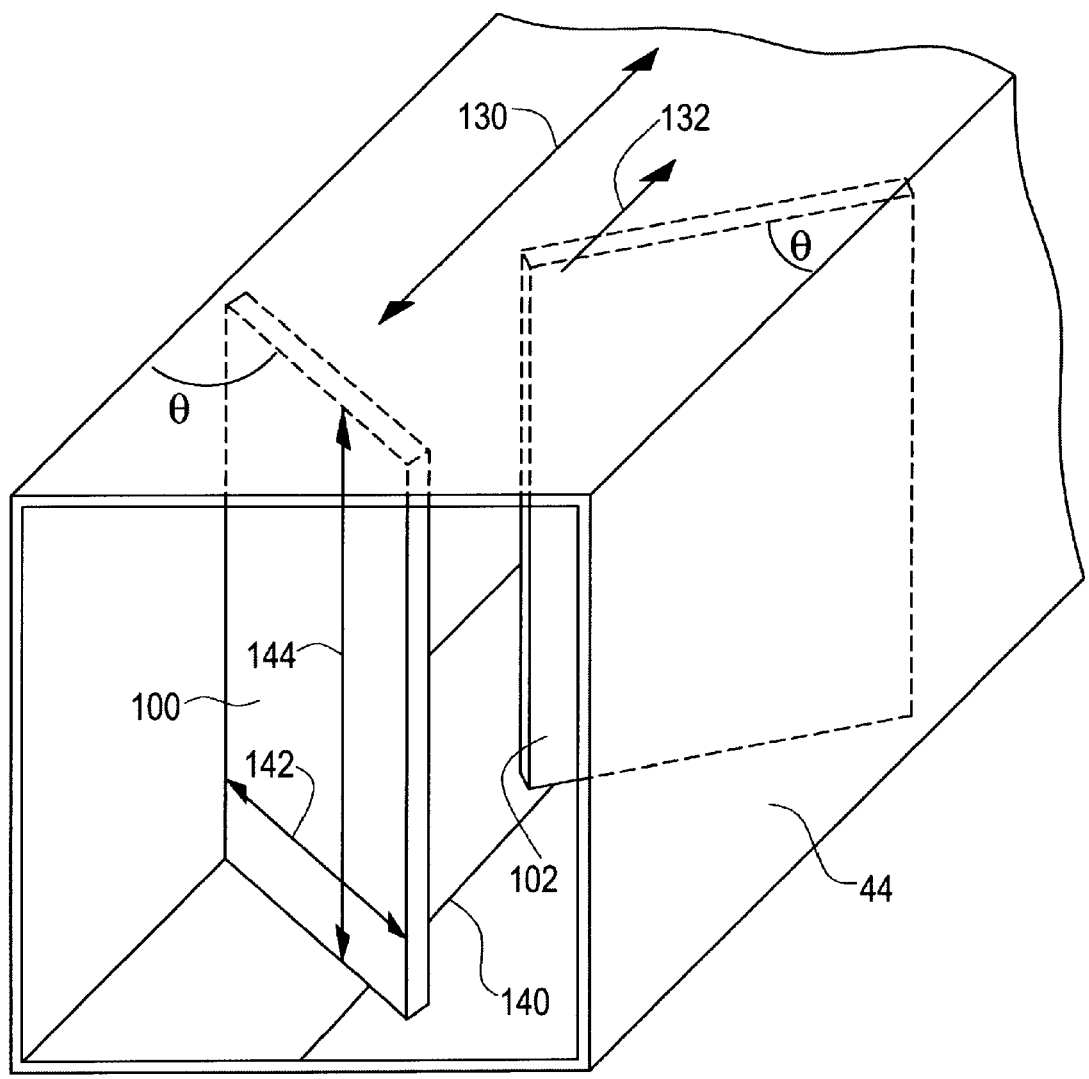
FIG. 6 is an isometric end view of one decontamination duct of the decontamination subsystem of this invention.

As shown more clearly in FIGS. 4 and 6, collision baffles 100 and 102 of decontamination duct 44 are disposed at acute angle θ (for example between 40°–80°) with respect to longitudinal axis 130 of duct 44 and angled into the incoming gas or, stated another way, angled opposite, or away from the flow direction 132. This orientation ensures that the gas experiences changes in kinetic energy which assists in the collection of contaminants.

A non-acute (e.g. 90°) angle is possible for the baffles but the system might then require the use of auxiliary blowers or vacuum pumps to move the contaminated gas past the baffles. In the preferred embodiment, gas flow past the baffles is provided by the fans already inherent in the oven and vertical intake and exhaust ducts 42, 48 and 49. Thus, the preferred embodiment shown in the drawings truly is a passive system. Angles which result (θ>90°) in the baffle plates angled in the direction of the flow result in a more developed region of laminar flow which might not provide sufficient contamination collection on the baffle surfaces.

Preferably, a portion of each baffle extends over the center line 140 of duct 44. In other words, each baffle has a width dimension 142, FIG. 6, a portion of which extends over center line 140. Also, each baffle's height dimension 144 extends entirely or almost between the top and bottom of duct 44. The construction of decontamination duct 44 is typically the same as duct 46.

Decontamination ducts 44 and 46 are shown to be essentially square in cross section and the collision baffles are shown to be plates, however, these are not necessary limitations of the subject invention. These ducts may be any conduit shape. Preferably, all the ducts and especially the baffles are made of aluminum in order to resist the corrosive effects of the contaminants and to optimize the heat transfer characteristics of the system. Stainless steel is an acceptable substitute, but is more expensive than aluminum. Also, the bottom 123, 125 of each decontamination duct 44 and 46, FIGS. 3 and 5, preferably slopes downwardly toward drain 127, FIG. 5 to drain off contaminates which collect in each decontamination duct.

Also, the preferred embodiment discussed above shows two decontamination ducts so that the position of fans 22, 28, and 30, FIG. 1, do not have to be moved or redesigned but this is not a limitation of the subject invention. Indeed, the decontamination subsystem 40, FIG. 1, or an equivalent system with the baffle arrangement shown in FIGS. 4–6 may prove useful outside of solder reflow convection oven technology.

In one system constructed in accordance with this invention, ducts 44 and 46 were about four inch square and the baffles about two and a half inches wide and about 5–6½ inches tall. The baffles proximate drain area 127, FIG. 5, are slightly taller due to sloping floor 123. In any case, the bottom edge of each baffle should be very close to the floor or bottom of the decontamination duct to insure that most of the oven gas is directed or forced around and about the baffles.

Each baffle is spaced approximately four inches apart and disposed at an angle of 60°. The incoming convection oven gas within intake duct 42 was 250°–270° C., but by the time it reaches baffle 100 it has cooled to 150°–180° C., an optimal commencement temperature for the start of condensing the contaminates. The oven gas cools thereafter to 130°–150° C. at the input to exhaust or outtake duct 48. These temperatures were used due to the nature of particular solder paste used for testing. A high temperature solder paste, for example, might require higher temperatures. Contaminates are accumulated on the baffle plates and the decontaminated oven gas is then supplied to the input of fan 22 as shown in FIG. 5. Accordingly, the subject invention prevents the fouling of the oven by contaminants in the oven gasses which previously condensed or deposited on the various components and the oven surfaces. Also, the present invention solves the clogging problem associated with prior art active systems which relied on condensers and filters.

The subject invention is passive because there are no moving parts and is instead driven in the preferred embodiment solely by the pressure and temperature differentials inherent in all convection ovens. The flow of gas into the intake duct or region, through the decontamination duct, and out the exhaust or out take duct or region is created in part by connecting the exhaust duct to the blower intake of one fan. The network of collision baffles in the decontamination duct or conduit captures the contaminants in the oven gasses to thereby prevent or eliminate fouling of the convection oven components and surfaces. In other embodiments, the collision baffles or surfaces could be eliminated but then the decontamination duct would likely need to be longer to cool the gas sufficiently to collect contaminates.

The decontamination system of this invention removes decontaminates by collision, cooling, and/or providing surface area for contaminant collection in a manner which does not inhibit the gas flow even over extended periods of operation unlike condenser/filter systems.

Although specific features of the invention are shown in some drawings and not in others, this is for convenience only as each feature may be combined with any or all of the other features in accordance with the invention.

Other embodiments will occur to those skilled in the art and are within the following claims.

What is claimed:

1. A reflow solder convection oven comprising:
   at least one heating zone with a gas intake and a gas outtake; and
   a passive gas decontamination subsystem including:
   an intake duct in fluid communication with the gas outtake of the at least one heating zone,
   at least one decontamination duct connected at one end to the intake duct, the decontamination duct including a plurality of collision baffles therein for collecting contaminants from the gas outtake of the at least one heating zone, in which the intake duct is vertically disposed and includes a drip tray therein to capture any contaminates condensing in the intake duct; and
   an outtake duct connected to the decontamination duct on an end opposite the intake duct and in fluid communication at an opposite end from the gas intake of the at least one heating zone.

2. A reflow solder convection oven comprising:
   at least one heating zone with a gas intake and a gas outtake; and
   a passive gas decontamination subsystem including:
   an intake duct in fluid communication with the gas outtake of the at least one heating zone,
   at least one decontamination duct connected at one end to the intake duct, the decontamination duct including a plurality of collision baffles therein for collecting contaminants from the gas outtake of the at least one heating zone; and
   an outtake duct connected to the decontamination duct on an end opposite the intake duct and in fluid communication at an opposite end from the gas intake of the at least one heating zone, in which the outtake duct is vertically disposed and includes a drip tray therein to capture any contaminates condensing in the outtake duct.

3. A reflow solder convection oven comprising:
   at least one heating zone with a gas intake and a gas outtake; and
   a passive gas decontamination subsystem including:
   an intake duct in fluid communication with the gas outtake of the at least one heating zone,
   at least one decontamination duct connected at one end to the intake duct, the decontamination duct including a plurality of collision baffles therein for collecting contaminants from the gas outtake of the at least one heating zone, wherein the discontamination duct is square with a sloped bottom, and
   an outtake duct connected to the decontamination duct on an end opposite the intake duct and in fluid communication at an opposite end from the gas intake of the at least one heating zone.

4. A closed, passive gas decontamination system for a convection oven, the passive gas decontamination system comprising:

- an intake duct responsive to a gas flow containing contaminants within the convection oven;
- a decontamination duct connected on one end to the intake duct, the decontamination duct including a plurality of collision baffles therein for collecting contaminants from the gas; and
- an outtake duct connected to the decontamination duct opposite the intake duct and terminating at a location within the oven remote from the intake duct,
- wherein the intake and outtake ducts are vertically disposed and include a drip tray therein to capture any contaminates condensing therein.

5. A closed, passive gas decontamination system for a convection oven, the passive gas decontamination system comprising:

- an intake duct responsive to a gas flow containing contaminants within the convection oven;
- a decontamination duct connected on one end to the intake duct for collecting contaminants from the gas; and
- an exhaust duct connected to the decontamination duct opposite the intake duct and terminating at a location within the oven remote from the intake duct, wherein the intake and outtake ducts are vertically disposed and include a drip tray therein to capture any contaminates condensing therein.

* * * * *